(12) United States Patent
Wang et al.

(10) Patent No.: US 12,518,402 B2
(45) Date of Patent: Jan. 6, 2026

(54) SCANNER AND TRACKING THREE-DIMENSIONAL SCANNER

(71) Applicant: SCANTECH (HANGZHOU) CO., LTD., Hangzhou (CN)

(72) Inventors: Jiangfeng Wang, Hangzhou (CN); Shangjian Chen, Hangzhou (CN); Jun Zheng, Hangzhou (CN); Chengjian Zhou, Hangzhou (CN)

(73) Assignee: SCANTECH (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 19/173,598

(22) Filed: Apr. 8, 2025

(65) Prior Publication Data

US 2025/0315960 A1 Oct. 9, 2025

(30) Foreign Application Priority Data

Apr. 8, 2024 (CN) .......................... 202420711476.5

(51) Int. Cl.
*H04N 23/50* (2023.01)
*G06T 7/246* (2017.01)

(52) U.S. Cl.
CPC ............. *G06T 7/246* (2017.01); *H04N 23/50* (2023.01); *G06T 2207/30204* (2013.01)

(58) Field of Classification Search
CPC .................... G07G 1/0081; G05B 2219/37558
See application file for complete search history.

(56) References Cited

U.S. PATENT DOCUMENTS

| | | | |
|---|---|---|---|
| 2007/0007353 A1* | 1/2007 | Danielson | G06K 7/10881 235/462.46 |
| 2008/0111985 A1 | 5/2008 | Bridges | |
| 2022/0201269 A1* | 6/2022 | Atwell | G01B 11/2545 |
| 2022/0262067 A1 | 8/2022 | Kwiatkowski et al. | |
| 2023/0149096 A1 | 5/2023 | Mariampillai | |
| 2023/0393272 A1* | 12/2023 | Siddiq | H01Q 21/065 |
| 2024/0041329 A1* | 2/2024 | Wang | G01N 29/2418 |

(Continued)

FOREIGN PATENT DOCUMENTS

| | | | | |
|---|---|---|---|---|
| CN | 106679590 A | | 5/2017 | |
| CN | 108613626 A | * | 10/2018 | ........... G01B 11/002 |

(Continued)

OTHER PUBLICATIONS

China National Intellectual Property Administration Utility Model Patent Appraisal Report issued in corresponding CN Application No. ZL2024207114765 with English translation dated Nov. 15, 2024 (8 pages).

(Continued)

*Primary Examiner* — Jayanti K Patel
*Assistant Examiner* — Christopher Kingsbury Glover
(74) *Attorney, Agent, or Firm* — Osha Bergman Watanabe & Burton LLP

(57) ABSTRACT

A scanner for a tracking three-dimensional scanning system is provided. The scanner includes a frame configured as an integral structure and defining an inner cavity and an outer periphery; and a plurality of marker modules disposed at the outer periphery of the frame and configured to be detected by a tracker in the tracking three-dimensional scanning system to obtain three-dimensional spatial coordinates of the scanner.

21 Claims, 9 Drawing Sheets

(56) References Cited

U.S. PATENT DOCUMENTS

| | | | |
|---|---|---|---|
| 2024/0168206 A1* | 5/2024 | Meng | ........................ G02B 5/09 |
| 2024/0263939 A1 | 8/2024 | Miyaki et al. | |

FOREIGN PATENT DOCUMENTS

| | | | |
|---|---|---|---|
| CN | 210567185 U | * | 5/2020 |
| CN | 212539083 U | | 2/2021 |
| CN | 114370819 A | | 4/2022 |
| CN | 218103220 U | | 12/2022 |
| CN | 218411072 U | | 1/2023 |
| CN | 219956416 U | | 11/2023 |
| JP | 2006003140 A | | 1/2006 |

OTHER PUBLICATIONS

Extended European Search Report issued in European Application No. 25169306.5, mailed on Aug. 5, 2025 (8 pages).

* cited by examiner

SCANNER AND TRACKING THREE-DIMENSIONAL SCANNER

TECHNICAL FIELD

The present disclosure relates to the technical field of scanners, in particular to a scanner and a tracking three-dimensional scanning system.

BACKGROUND

The scanner is an important component of a tracking three-dimensional scanning system. Generally, a certain number of markers are disposed on the surface of the scanner and can be detected by the tracker to obtain the spatial coordinates of the scanner in real time. Therefore, the stability and installation reliability of the markers with regard to their spatial arrangement on the surface of the scanner are highly demanding.

In conventional scanners, a frame is generally formed by assembling a plurality of parts, such as carbon fiber plates and metal pieces, with the markers subsequently disposed on the outer periphery of the frame. However, because the frame is assembled from a plurality of carbon fiber plates and metal pieces, such frameworks require cumbersome assembly, and in the assembling process, the fixation of two adjacent carbon fiber plates may loosen or shift during installation, compromising the structural stability of the whole structure of the assembled frame.

SUMMARY

A summary of some aspects of the present disclosure is provided below, which will be further described below in the detailed description. This summary is not intended to identify key or essential features of the claimed subject matter, nor is it intended to be used as a means to limit the scope of the claimed subject matter.

In some aspects, the techniques described herein relate to a scanner for a tracking three-dimensional scanning system, including: a frame configured as an integral structure and defining an inner cavity and an outer periphery; and a plurality of marker modules disposed at the outer periphery of the frame and configured to be detected by a tracker.

In some aspects, the techniques described herein relate to a scanner, wherein the frame includes a plurality of struts that are interconnected to form the integral structure of the frame.

In some aspects, the techniques described herein relate to a scanner, wherein the frame further includes a plurality of connecting portions, and each of the marker modules is mounted to a corresponding connecting portion.

In some aspects, the techniques described herein relate to a scanner, wherein the connecting portions are embedded to the struts to form the integral structure of the frame.

In some aspects, the techniques described herein relate to a scanner, further including a support configured to support the scanner.

In some aspects, the techniques described herein relate to a scanner, wherein the support is disposed on one or more of the connecting portions, and a predefined gap is formed between the support and the marker module mounted on a same connecting portion.

In some aspects, the techniques described herein relate to a scanner, wherein each of the marker modules includes a plurality of markers, and the plurality of marker modules are evenly distributed on the outer periphery, such that a number of markers that are visible remains consistent when viewing the scanner from different angles.

In some aspects, the techniques described herein relate to a scanner, wherein the marker modules are distributed on the outer periphery of the frame in an icosahedron pattern.

In some aspects, the techniques described herein relate to a scanner, wherein the marker modules are distributed on the outer periphery of the frame in a dodecahedron pattern.

In some aspects, the techniques described herein relate to a scanner, further including a projection module and a camera module that are both mounted on the frame.

In some aspects, the techniques described herein relate to a scanner, wherein the projection module is a laser module.

In some aspects, the techniques described herein relate to a scanner, wherein two camera modules are disposed on two opposite sides of the projection module, respectively.

In some aspects, the techniques described herein relate to a scanner, wherein the frame defines a first predefined gap connecting the inner cavity and the outer periphery, and the camera module is mounted on the frame within the inner cavity and extends outward through the first predefined gap to the outer periphery.

In some aspects, the techniques described herein relate to a scanner, wherein the camera module is mounted on the outer periphery of the frame.

In some aspects, the techniques described herein relate to a scanner, wherein the projection module includes a protective cover having a plurality of openings to allow light generated by the projection module during operation to be emitted outward to the outer periphery through the openings.

In some aspects, the techniques described herein relate to a scanner, wherein a plurality of markers are arranged on the protective cover along a circumferential direction of the protective cover.

In some aspects, the techniques described herein relate to a scanner, further including a handle disposed in the inner cavity and connected to the frame.

In some aspects, the techniques described herein relate to a scanner, wherein the handle has an interface for external connection.

In some aspects, the techniques described herein relate to a scanner, wherein the frame defines a second predefined gap connecting the inner cavity and the outer periphery, and the second predefined gap is configured to allow access from the outer periphery to the inner cavity for operating the interface.

In some aspects, the techniques described herein relate to a tracking three-dimensional scanning system, including: the scanner; and a tracker configured to detect the marker modules of the scanner.

In the scanner and the tracking three-dimensional scanner according to one or more embodiments of the present disclosure, the frame is configured as an integral structure, and the marker modules are mounted by using the connecting members embedded onto the frame, so that the frame and the connecting members of the scanner can be integrally made by using a mold as opposed to being assembled. Thus, not only the production of the frame is made easier, but also the structural strength of the frame is ensured, which in turn improves the stability of the overall structure of the frame.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

Figure 1:
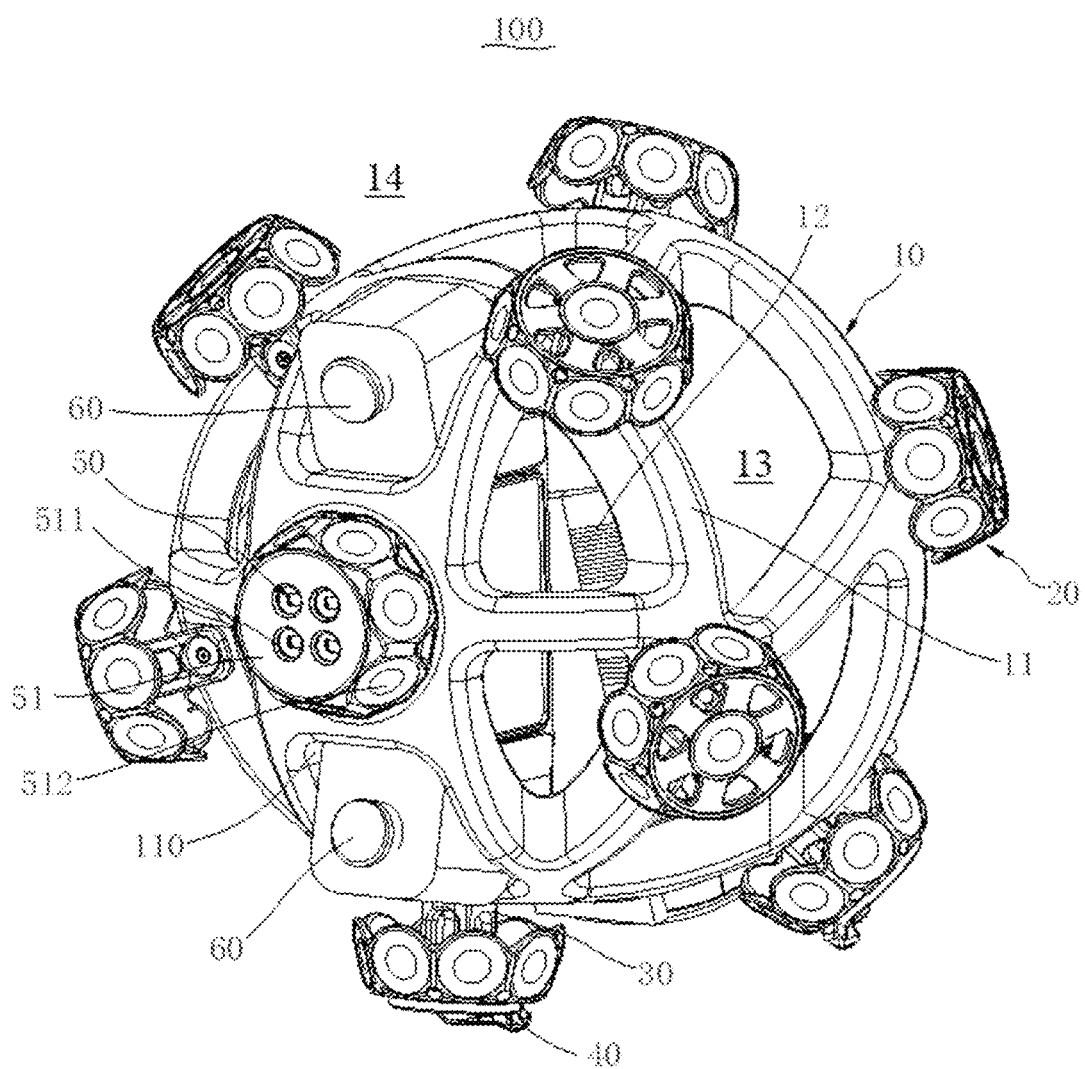
FIG. 1 is a schematic structural diagram of a scanner according to one or more embodiments of the present disclosure.

List of reference numbers: 100, scanner; 10, frame; 11, strut; 12, handle; 13, inner cavity; 14, outer periphery; 110, first predefined gap; 120, second predefined gap; 20, marker module; 30, connecting portion; 31, intermediate member (extended protruding column); 301, screw; 40, support; 50, laser module; 51, protective cover; 511, opening; 512, marker; 60, camera module; 101, interface; 102, protective cap; 200, wireless network interface controller; 300, scanning system; 400 tracker.

DETAILED DESCRIPTION

In the following detailed description of one or more embodiments of the present disclosure, numerous specific details are set forth in order to provide a more thorough understanding of the present disclosure. However, it will be apparent to one of ordinary skill in the art that the present disclosure may be practiced without these specific details. In other instances, well-known features have not been described in detail to avoid unnecessarily complicating the description.

Throughout the disclosure, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms (a, an, the) of elements include plural referents unless the context clearly dictates otherwise. Therefore, for example, reference to "a system" may include one or more such systems.

Terms such as "about" and "substantially" mean that the described characteristic, parameter, or value does not need to be exact, but that deviations or variations (including, for example, tolerances, measurement errors, limitations in measurement precision, and other factors known to one of ordinary skill in the art) may occur in amounts that do not preclude the effect that the characteristic is intended to provide.

In the following description with reference to the figures, any component described with regard to a figure may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

FIG. 1 illustrates a structural schematic of a scanner according to one or more embodiments of the present application. As shown in FIG. 1, a scanner (100) comprises a frame (10) and a plurality of marker modules (20). The frame (10) is an integral structure, defining an inner cavity (13) and an outer periphery (14) opposite to the inner cavity. The plurality of marker modules (20) are mounted on the outer periphery (14) of the frame (10) and can be detected by a tracker. Each marker module includes, for example, a body and multiple markers made of high-reflectivity material disposed on the body's surface.

In one or more embodiments, the frame (10) may comprise a plurality of struts (11) interconnected to form the integral structure. The frame (10) may have a plurality of connecting portions (30). Each marker module (20) is mounted on a corresponding connecting portion (30).

In one or more embodiments, the scanner (100) may include a support (40) configured to support and stabilize the scanner (100). One or more connecting portions (30) may be equipped with the support (40). A predefined gap may be formed between the support (40) and the marker module (20) that are mounted on the same connecting portion (30). In one or more embodiments, the support (40) may be directly fixed to one or more of the marker modules (20).

Figure 9:
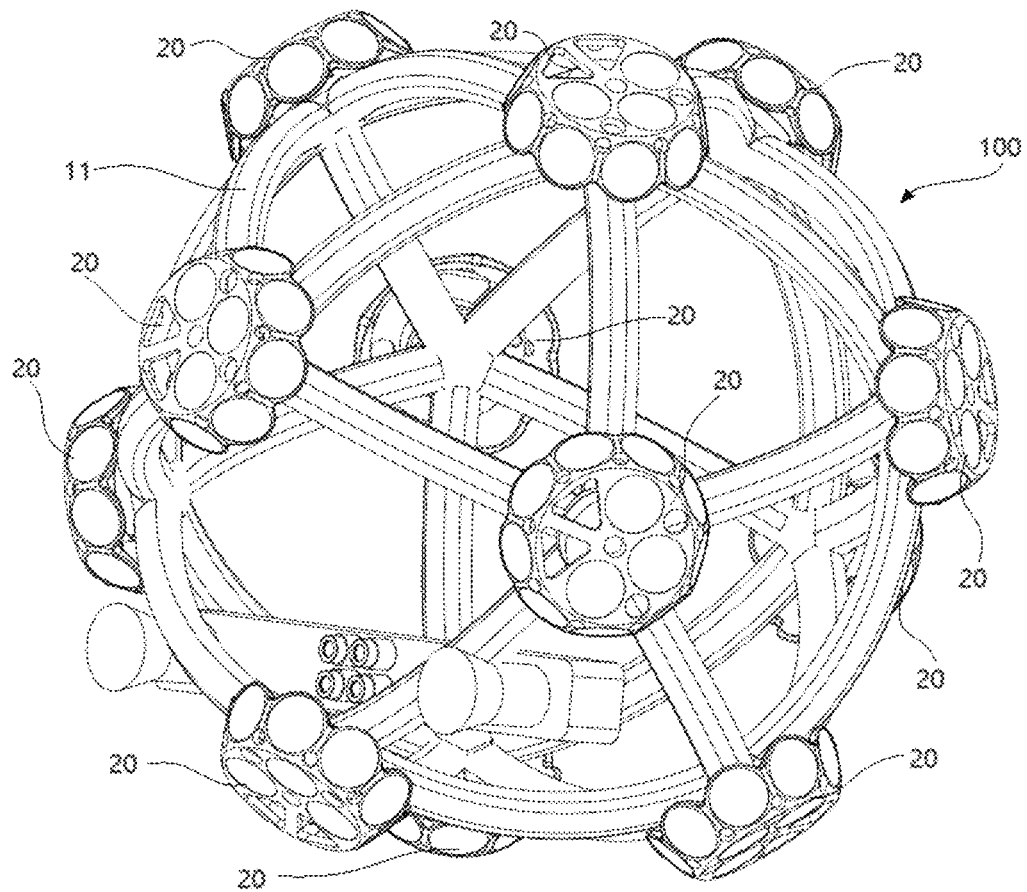
FIG. 9 is a schematic structural diagram of a scanner according to one or more embodiments of the present disclosure.

In one or more embodiments, each marker module (20) is provided with a plurality of markers (512). The marker modules (20) may be evenly distributed on the outer periphery of the frame (10). This ensures that a number of markers (21) that are visible remains consistent when viewing the scanner from different angles. In one or more embodiments, the marker modules (20) may be arranged on the outer periphery of the frame in icosahedron or dodecahedron patterns as illustrated in FIG. 9.

In one or more embodiments, the scanner (100) may comprise a projection module (50) and one or more camera modules (60). The projection module (50) may be, for example, a laser module or any other types of modules for projecting patterns or stripes. The one or more camera modules (60) are configured to capture surface image data of an object and may comprise, for example, cameras, lenses, and light sources. Both the projection module (50) and the one or more camera modules (60) are mounted on the frame (10). The projection module (50) and the one or more camera modules (60) may be mounted on the frame individually or collectively as a whole. In one or more embodiments, two camera modules (60) are symmetrically disposed at two opposite sides of the projection module (50). While a number of two camera modules are disclosed in FIG. 1, it is noted that a number of camera modules is not limited and may be any number as needed in practical applications. In one or more embodiments, the frame (10) defines first predefined gaps (110) connecting the inner cavity (13) and outer periphery (14), allowing the camera modules (60) to be mounted from the inner cavity (13) and acquire images. In one or more embodiments, the camera modules (60) may be configured to extend from the inner cavity (13) to the outer periphery (14) through the first predefined gaps (110), or may be configured to be entirely accommodated within the inner cavity (13) while using the first predefined gaps (110) as an optical path to acquire external images.

In one or more embodiments, the projection module (50) may include a protective cover (51) with a plurality of openings (511), to allow light generated by the projection module (50) during operation to be emitted outward through the openings (511). A plurality of markers (512) may be arranged on the protective cover (51) along a circumferential direction of the protective cover.

Figure 2:
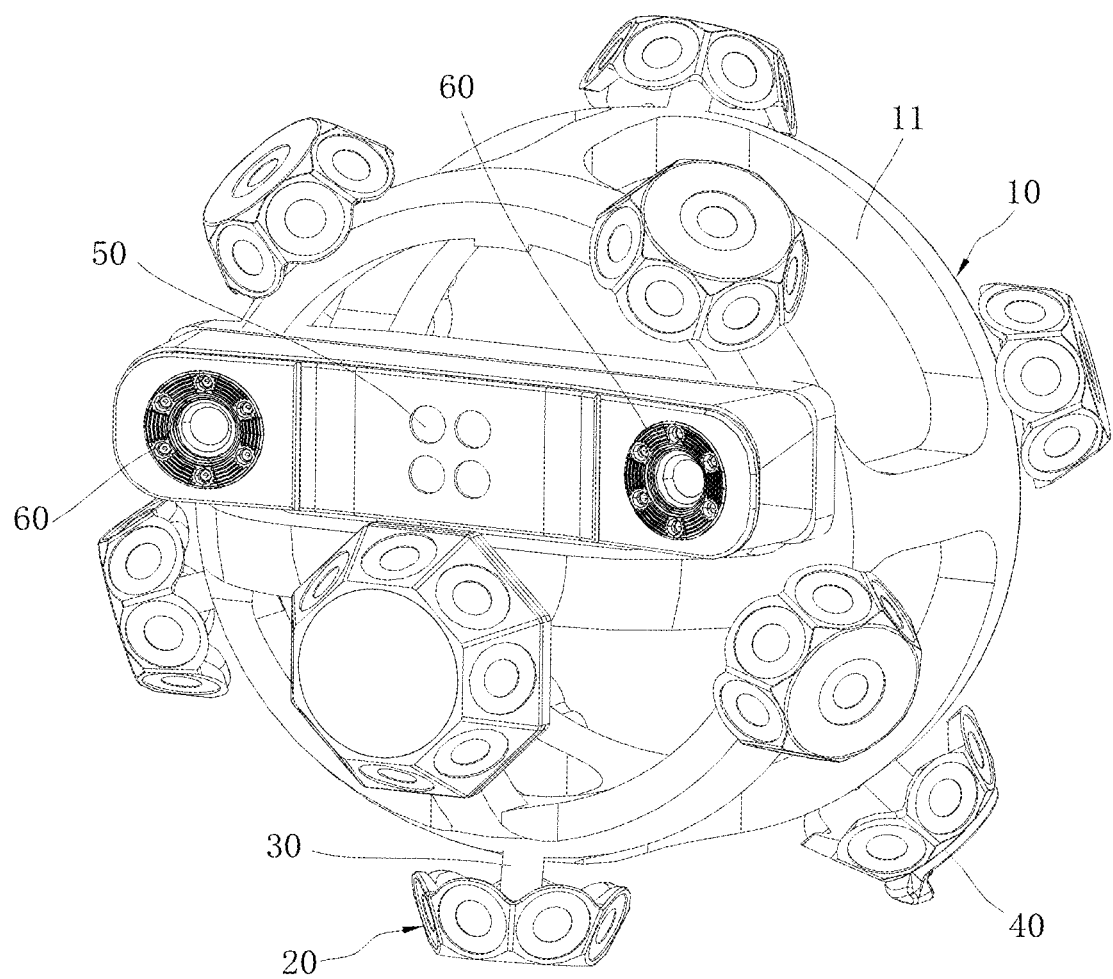
FIG. 2 is a schematic structural diagram of a scanner according to one or more embodiments of the present disclosure.

FIG. 2 shows a structural schematic of a scanner according to one or more embodiments of the present disclosure. The scanner illustrated in FIG. 2 share similar structures with those discloses in FIG. 1, which are not repeated here. In the embodiments disclosed in FIG. 2, the camera modules (60) may be mounted on the outer periphery (14) of the frame (10). Two camera modules (60) are symmetrically disposed at two opposite sides of the projection module (50), and the projection module (50) and the two camera modules (60) are collectively mounted to the outer periphery of the frame (10) as a whole.

Figure 3:
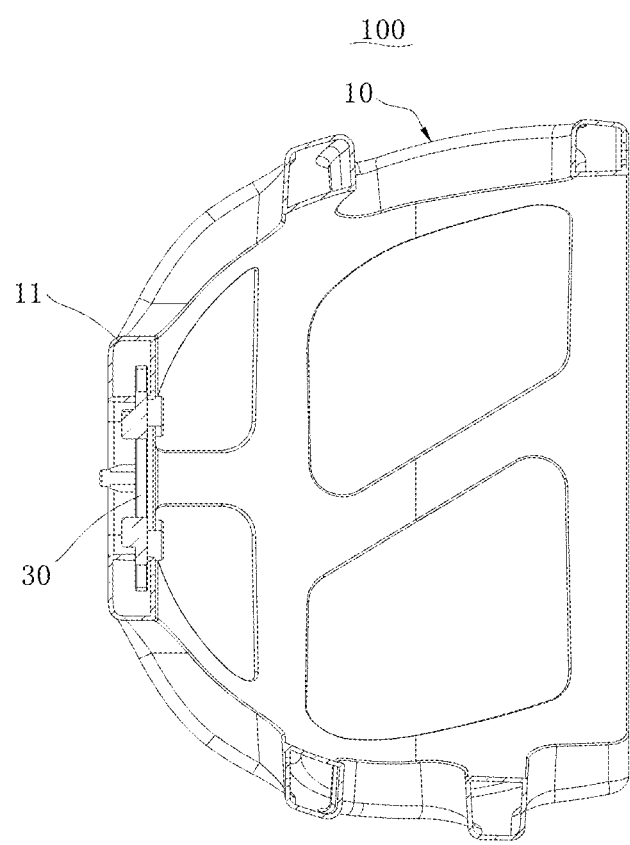
FIG. 3 is a cross-sectional view of a frame of a scanner according to one or more embodiments of the present disclosure.

FIG. 3 shows a cross-sectional view of a frame of a scanner according to one or more embodiment. The frame (10), similar to that in FIG. 1, may have an integral structure and may comprise a plurality of struts (11) interconnected to form the integral structure. One or more of the struts (11) are provided with connecting portions (30). The connecting portions (30) may serve as mounting points for components such as marker modules, support, projection module, or camera modules as needed. In one or more embodiments, the connecting portions (30) may be mounted into the struts (11) as a part of the integral structure, for example, as an embedment. In one or more embodiments, the integral structure of the frame may be formed through molding using a mold. Metal or plastic raw material of the connecting portions may be prepositioned in the mold and coated with a coating material to form the integral structure comprising connecting portions. The integral structure may be formed by any known molding method, including but not limited to thermoforming, compression molding, injection molding.

Figure 4:
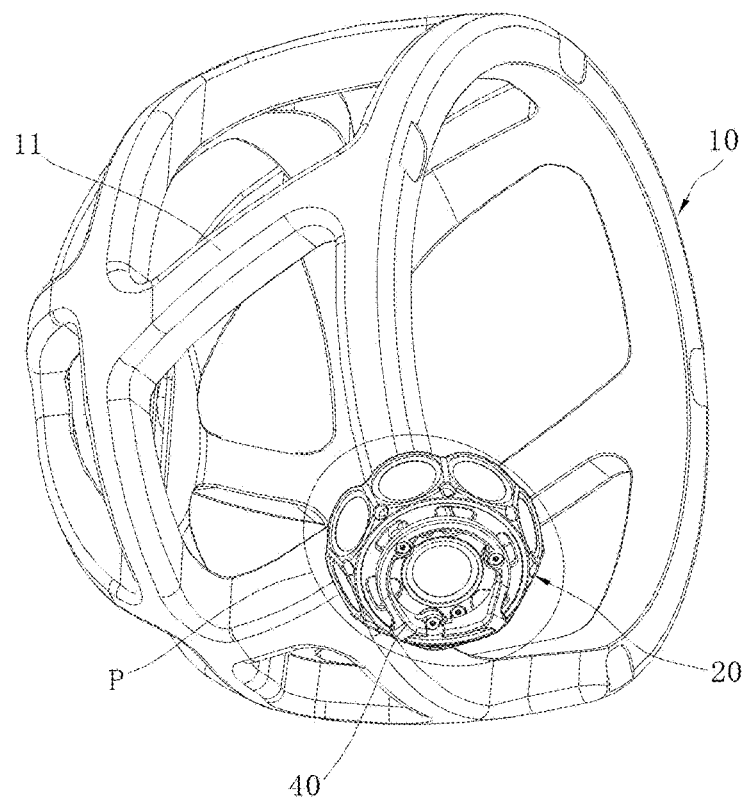
FIG. 4 is a partial structural diagram of a scanner according to one or more embodiments of the present disclosure.
Figure 5:
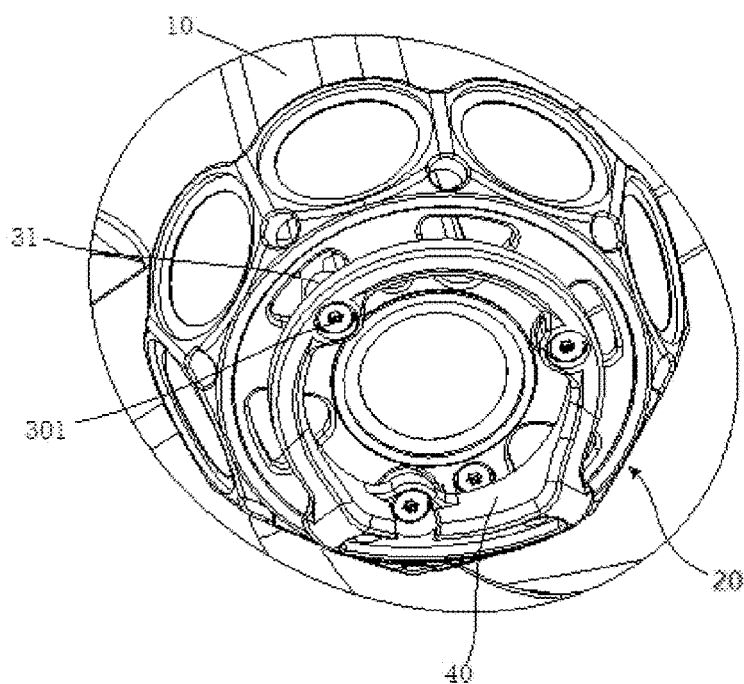
FIG. 5 is an enlarged view of the portion P of FIG. 4.

FIGS. 4 and 5 illustrate a scanner according to one or more embodiments of the present disclosure. FIG. 4 shows a partial structural view, displaying only the frame (10) of the scanner with the marker modules (20) and support (40) mounted on the struts (11) at the frame's outer periphery. FIG. 5 is an enlarged view of section P in FIG. 4. As depicted in FIGS. 4 and 5, the marker modules (20) and the support (40) are both connected to one of the connecting portions (30). A predefined gap may be formed between the support (40) and the module (20). The predefined gap ensures that when the scanner (100) is supported by the support (40), the marker module (20) won't be displaced due to force from the support (40), maintaining its precise alignment on the frame (10). In other words, deformation caused by force applied on the support (40) won't affect the marker module's (20). The marker modules (20) and the support (40) may be mounted directly or indirectly to the connection portion (30) in any suitable manner. In one or more embodiments, an intermediate member (31) may be implemented and can be fixed to the connection portion (30), and the marker modules (20) and the support (40) are both mounted to the intermediate member (31). In one or more embodiments, the intermediate member (31) may be an extension post. As shown in FIG. 5, the connecting portion (30) may comprise one or more extension posts that extrude to the corresponding marker module (20). The support (40) may be connected to the extension posts using screws (301). The configuration of the support (40) is not limited to connection via the connecting portion (30) as shown in the figures. Those skilled in the art would recognize that the support (40) may also connect directly to marker modules (20).

Figure 6:
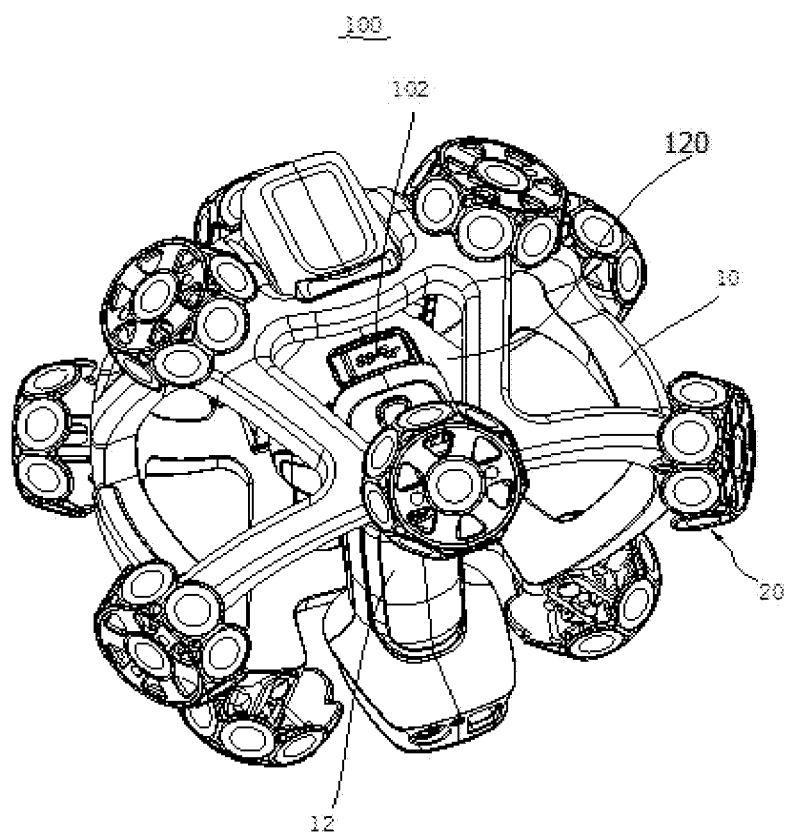
FIG. 6 is a schematic structural diagram of a scanner according to one or more embodiments of the present disclosure, in which an interface is covered by a protective cover.
Figure 7:
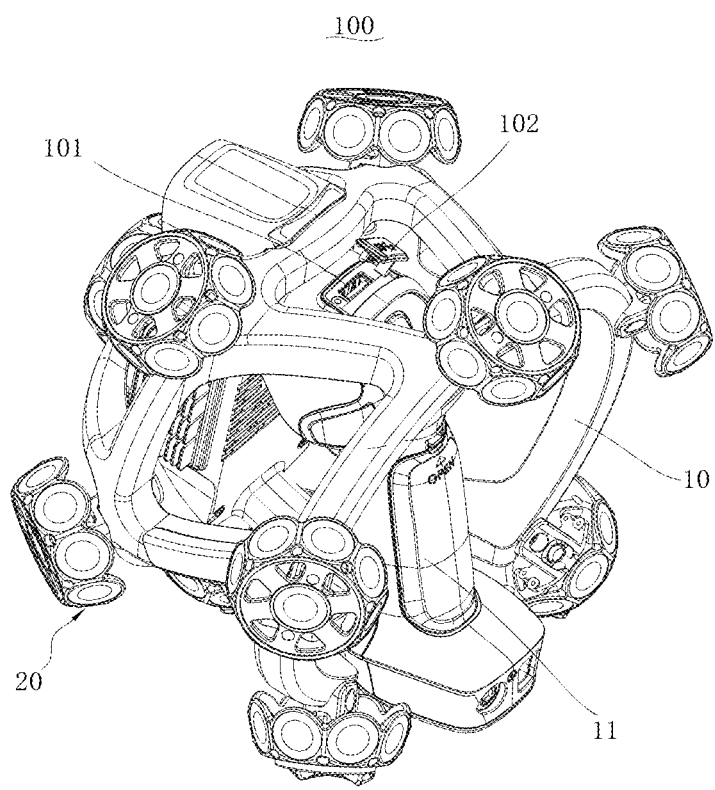
FIG. 7 is a schematic structural diagram of a scanner according to one or more embodiments of the present disclosure, in which an interface is exposed without being covered by a protective cover.
Figure 8:
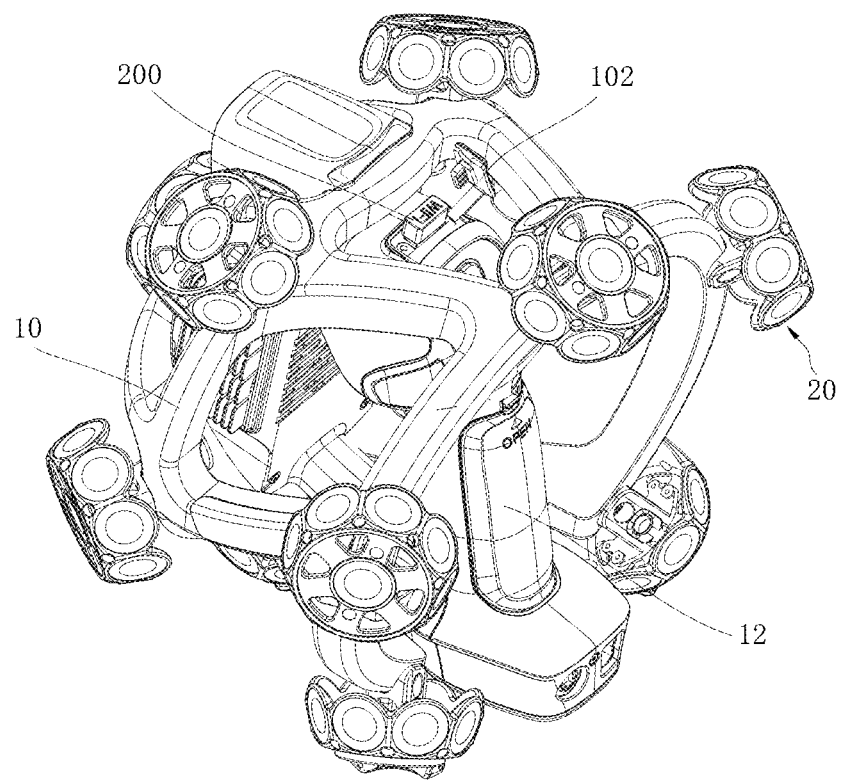
FIG. 8 is a schematic structural diagram of a scanner according to one or more embodiments of the present disclosure, in which a WNIC is plugged in the interface.

FIGS. 6 to 8 show schematic diagrams of a scanner according to one or more embodiments. FIG. 6 shows an interface (101) covered by a protective cap (102), FIG. 7 shows a configuration that the interface (101) is exposed, and FIG. 8 shows a configuration when a WNIC (200) is inserted into the interface (101).

In one or more embodiments, the scanner (100) further comprises a handle (12) disposed in the inner cavity (13) and connected to the frame (10). The interface (101) may be provided on the handle (12). A second predefined gap (120) may be defined by the frame (10) as the portion linking the inner cavity (13) and outer periphery (14). The second predefined gap (120) allows access from the outer periphery (14) to the inner cavity (13) when operating the interface (101).

Figure 10:
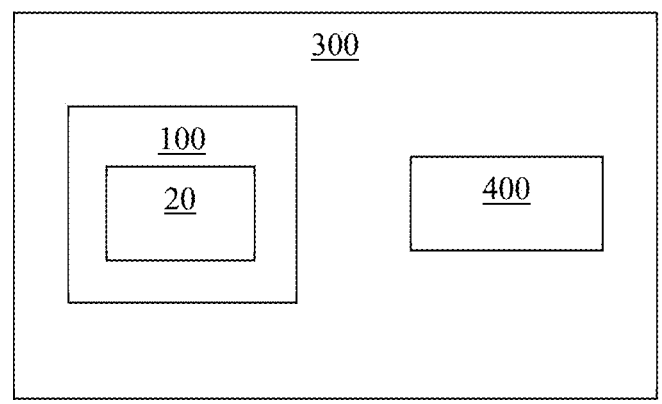
FIG. 10 is a schematic block diagram of a tracking three dimensional scanning system.

FIG. 10 shows a schematic of a tracking three-dimensional scanning system (300), comprising: the scanner (100) with the structure and functions described in the figures and embodiments disclosed herein; and a tracker (400) configured to detect the markers on the scanner's marker modules (20). The tracker may integrate components such as an optical tracker, control unit, and data parameter module.

Beyond the features outlined above, the scanner may incorporate additional improvements, variations, and advantages. Non-limiting configurations of the scanner and variations will be described in accordance with the figures.

As shown in FIGS. 1 and 2, a scanner 100 according to one or more embodiments of the present disclosure includes a frame 10 and a plurality of marker modules 20. The frame 10 is configured as an integral structure. A plurality of connecting portions 30 are embedded onto the frame 10. The plurality of marker modules 20 are disposed at an outer periphery of the frame 10 and each marker module 20 is connected to one of the plurality of connecting portions 30. The plurality of marker modules 20 are mounted on the frame 10 via the corresponding connecting portion 30 and are configured to be detected by a tracker (not shown). In some embodiments, the frame 10 is made of a carbon fiber material and is formed integrally by using a mold.

It can be understood that the frame 10 is configured as an integral structure, and the marker modules 20 are mounted by using the connecting portions 30 embedded onto the frame 10, so that the frame 10 and the connecting portions 30 of the scanner 100 can be integrally formed by using a mold as opposed to being assembled. Such configuration not only facilitates the production and preparation of the frame 10 but also ensures its structural strength, thereby enhancing the overall stability of the frame 10.

As shown in FIGS. 1-3, the frame 10 includes a plurality of struts 11 that are interconnected. In some embodiments, the struts 11 are formed as a hollow structure. In other words, the frame 10 may be formed by the interconnected hollow struts 11. By virtue of the hollow structure of the struts 11, not only the bending resistance of the struts 11 can be improved so as to further improve the structural strength of the frame 10, but also the overall weight of the frame 10 can be reduced. Here, the struts 11 may be configured as carbon fiber square tubes or carbon fiber cylindrical tubes. The number and the arrangement of the struts 11 can be specifically configured according to the operation requirements of the frame 10. It should be noted that the struts 11 that constitute the frame 10 are not limited to the hollow structure shown in the figures. The struts 11 may also be configured as a solid structure.

As shown in FIG. 1, the scanner 100 further includes a handle 12 connected to the frame 10 and disposed within the frame 10. The handle 12 allows a user's hand to reach inside the frame 10 for gripping. In some embodiments, the center of gravity of the scanner 100 is on the handle 12. By virtue of this configuration, the user feels more balanced forces from the scanner 100 when the user is holding onto the handle 12. This significantly improves the gripping experience of the user when the user is holding the scanner 100. In one or more embodiments, the center of gravity of the scanner 100 may be specifically distributed at the gripping portion of the handle 12 to be held by the user's hand.

In one or more embodiments, when the frame 10 is molded in the mold, the connecting portions 30 may be prepositioned in the mold, so that the connecting portions 30 and the frame 10 are formed into an integral structure. The integral structure enhances bonding strength and reliability between the connecting portions 30 and the frame 10. In some embodiments, the connecting portions 30 may be made of metal.

As shown in FIGS. 1, 2, 4, and 5, the scanner 100 may further include a support 40. The scanner 100 can be placed on a surface via the support 40. For example, the scanner 100 can be directly placed on the ground via the support 40 when not in use. Accordingly, the need of a stand specially designed for supporting the scanner 100 can be eliminated, which facilitates user convenience when using the scanner 100. In some embodiments, the support 40 is made of plastic. In one or more embodiments, the support 40 may include three supports disposed in a triangular arrangement, so that the stability can be further improved when the scanner 100 is supported by the support 40.

As shown in FIG. 1, respective center lines of any two adjacent marker modules 20 among the plurality of marker modules 20 intersect at a center point of the frame 10, forming evenly distributed arc angles. That is, an angle between the center lines of two adjacent marker modules 20 is equal to another angle between the center lines of any other adjacent marker modules 20. In other words, the plurality of marker modules 20 are evenly distributed on the outer periphery of the frame 10, so that the tracker can easily detect the marker modules 20 on the scanner 100. The plurality of marker modules 20 may alternatively be arranged on the frame 10 in other configurations, which are readily recognized by those skill in the art and without departing from the scope of the present disclosure, and will not be described herein.

As shown in FIGS. 1 and 2, the scanner 100 further includes a laser module 50 and two camera modules 60. The two camera modules 60 are disposed on two opposite sides of the laser module 50, respectively. The laser module 50 and the two camera modules 60 are mounted onto the frame 10. In one or more embodiments, when the scanner 100 is placed on a flat surface via the support 40, the camera modules 60 and the laser module 50 are inclined toward the handle 12, so that the center of gravity of the scanner 100 shifts rearward. This configuration improves the stability of the scanner 100 when placed on a flat surface, and prevents the scanner 100 from tilting forward and tipping, causing damage to the camera modules 60 and the laser module 50. It should be noted that the specific structures of the laser module 50 and the two camera modules 60, as well as their collaborative operation principles for scanning target objects, can be implemented in conventional existing methods and devices, and will not be further described herein.

As shown in FIG. 1, in one or more embodiments, the laser module 50 and the two camera modules 60 are disposed on the frame 10 along a vertical direction of the frame 10.

As shown in FIG. 2, in one or more embodiments, the laser module 50 and the two camera modules 60 are disposed on the frame 10 along a transverse direction of the frame 10. Specifically, the laser module 50 and the two camera modules 60 may be disposed in an upper portion or a lower portion at a front side of the frame 10. The laser module 50 and the two camera modules 60 may be disposed partially inside the frame 10 or entirely outside the frame 10, depending on required applications.

As shown in FIG. 1, the laser module 50 is provided with a protective cover 51 having a plurality of openings 511, allowing laser light generated by the laser module 50 to emit outward through the openings 511, so that the protective cover 51 can protect the laser module 50 without interfering with normal operation of the laser module 50.

In one or more embodiments, a plurality of markers 512 are disposed on the protective cover 51 along a circumferential direction so as to be detected by the tracker corresponding to the scanner 100. The plurality of markers 512 on each protective cover 51 collectively form the mark module 20 of the scanner 100.

As shown in FIG. 1, two predefined gaps 110 corresponding to the two camera modules 60 are formed in the frame 10. The camera modules 60 may extend from the inner cavity to the outer periphery of the frame 10 through the corresponding predefined gaps 110. In other words, the two camera modules 60 can be partially accommodated within the frame 10, so that the overall appearance of the scanner 100 is more compact and esthetic.

As shown in FIG. 1, in one or more embodiments, the laser module 50 is integrated with one of the marker modules 20. In other words, the laser module 50 and the corresponding mark module 20 are integrated as one module, thereby further improving the compactness of the scanner 100. It should be noted that the integration of the laser module 50 with the marker module 20 may adopt conventional existing methods and configurations, and is be further described herein.

As shown in FIGS. 6-8, the scanner 100 comprises an interface 101. A protective cap 102 is detachably connected to the interface 101. The interface 101 is configured for external connection. For example, the interface 101 may be configured for inserting and removing a wireless network interface controller (WNIC) 200, so that the scanner 100 has access to a network using the WNIC 200 facilitating user's operation of the scanner 100. In one or more embodiments, the protective cap 102 is attached to the scanner 100 in a flip-open manner, such that the protective cap 102 remains attached to the scanner 100 when the interface 101 is exposed by opening the protective cap 102, thereby preventing loss of the protective cap 102.

As shown in FIGS. 6-8, the interface 101 is disposed at one end of the handle 12 of the frame 10. The WNIC 200 may pass through the frame 10 and be plugged into or unplugged from the interface 101, making it easy for the user to plug the WNIC 200 into the interface 101 or unplug the WNIC 200 from the interface 101.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A scanner for a tracking three-dimensional scanning system, comprising:
a frame configured as an integral structure and defining an inner cavity and an outer periphery; and
a plurality of marker modules disposed at the outer periphery of the frame and configured to be detected by a tracker in the tracking three-dimensional scanning system to obtain three-dimensional spatial coordinates of the scanner.

2. The scanner according to claim 1, wherein the frame comprises a plurality of struts that are interconnected to form the integral structure of the frame.

3. The scanner according to claim 2, wherein the frame further comprises a plurality of connecting portions, and each of the marker modules is mounted to a corresponding connecting portion.

4. The scanner according to claim 3, wherein the connecting portions are embedded to the struts to form the integral structure of the frame.

5. The scanner according to claim 3, further comprising a support configured to support the scanner.

6. The scanner according to claim 5, wherein the support is disposed on one or more of the connecting portions, and a predefined gap is formed between the support and the marker module mounted on a same connecting portion.

7. The scanner according to claim 1, wherein each of the marker modules comprises a plurality of markers, and the plurality of marker modules are evenly distributed on the outer periphery, such that a number of markers that are visible remains consistent when viewing the scanner from different angles.

8. The scanner according to claim 7, wherein the marker modules are distributed on the outer periphery of the frame in an icosahedron pattern.

9. The scanner according to claim 7, wherein the marker modules are distributed on the outer periphery of the frame in a dodecahedron pattern.

10. The scanner according to claim 1, further comprising a projection module mounted on the frame.

11. The scanner according to claim 10, further comprising one or more camera modules mounted on the frame,
wherein the projection module and the one or more camera modules are individually mounted on the frame or collectively mounted on the frame as a whole.

12. The scanner according to claim 10, wherein the projection module is a laser module.

13. The scanner according to claim 11, wherein
the scanner comprises at least two camera modules disposed on two opposite sides of the projection module, respectively, and
the projection module and the two camera modules are individually mounted on the frame or collectively mounted on the frame as a whole.

14. The scanner according to claim 11, wherein the frame defines a first predefined gap connecting the inner cavity and the outer periphery, and the one or more camera modules are mounted on the frame within the inner cavity and acquire images through the first predefined gap.

15. The scanner according to claim 11, wherein the one or more camera modules are mounted on the outer periphery of the frame.

16. The scanner according to claim 10, wherein the projection module comprises a protective cover having a plurality of openings to allow light generated by the projection module during operation to be emitted outward to the outer periphery through the openings.

17. The scanner according to claim 16, wherein a plurality of markers are arranged on the protective cover along a circumferential direction of the protective cover.

18. The scanner according to claim 1, further comprising a handle disposed in the inner cavity and connected to the frame.

19. The scanner according to claim 18, wherein the handle has an interface for external connection.

20. The scanner according to claim 19, wherein the frame defines a second predefined gap connecting the inner cavity and the outer periphery, and the second predefined gap is configured to allow access from the outer periphery to the inner cavity for operating the interface.

21. A tracking three-dimensional scanning system, comprising:
the scanner according to claim 1; and
a tracker configured to detect the marker modules of the scanner.

* * * * *